United States Patent [19]

Gragg et al.

[11] Patent Number: 5,757,390
[45] Date of Patent: May 26, 1998

[54] INK VOLUME SENSING AND REPLENISHING SYSTEM

[75] Inventors: Brian D. Gragg; George T. Kaplinsky; Tofigh Khodapanah, all of San Diego; David W. Swanson, Escondido, all of Calif.; James E. Clark, Albany, Oreg.

[73] Assignee: Hewlett-Packard Company, Palo Alto, Calif.

[21] Appl. No.: 545,964

[22] Filed: Oct. 20, 1995

Related U.S. Application Data

[63] Continuation-in-part of Ser. No. 240,297, May 9, 1994, which is a continuation of Ser. No. 929,615, Aug. 12, 1992, abandoned, and a continuation-in-part of Ser. No. 302,077, Sep. 7, 1994, Pat. No. 5,541,632, which is a continuation of Ser. No. 928,811, Aug. 12, 1992, abandoned.

[51] Int. Cl.⁶ ............................. B41J 2/195; B41J 2/175
[52] U.S. Cl. ................................. 347/7; 347/85
[58] Field of Search ................................. 347/7, 85, 86, 347/87, 92

[56] References Cited

U.S. PATENT DOCUMENTS

| | | | |
|---|---|---|---|
| 4,301,459 | 11/1981 | Isayama et al. | 347/92 |
| 4,771,295 | 9/1988 | Baker et al. | 347/87 |
| 5,367,328 | 11/1994 | Erickson | 347/7 |

FOREIGN PATENT DOCUMENTS

| | | | |
|---|---|---|---|
| 573274 | 12/1993 | European Pat. Off. | 347/7 |
| 5-169679 | 7/1993 | Japan | 347/7 |

*Primary Examiner*—Benjamin R. Fuller
*Assistant Examiner*—Judy Nguyen

[57] ABSTRACT

A system for monitoring ink volume in an ink reservoir carried on-board the print head carriage and replenishing the ink as needed to maintain an adequate volume of ink in the print head carriage ink reservoir, such replenishment coming from an off-board ink supply not positioned on the print head carriage.

20 Claims, 5 Drawing Sheets

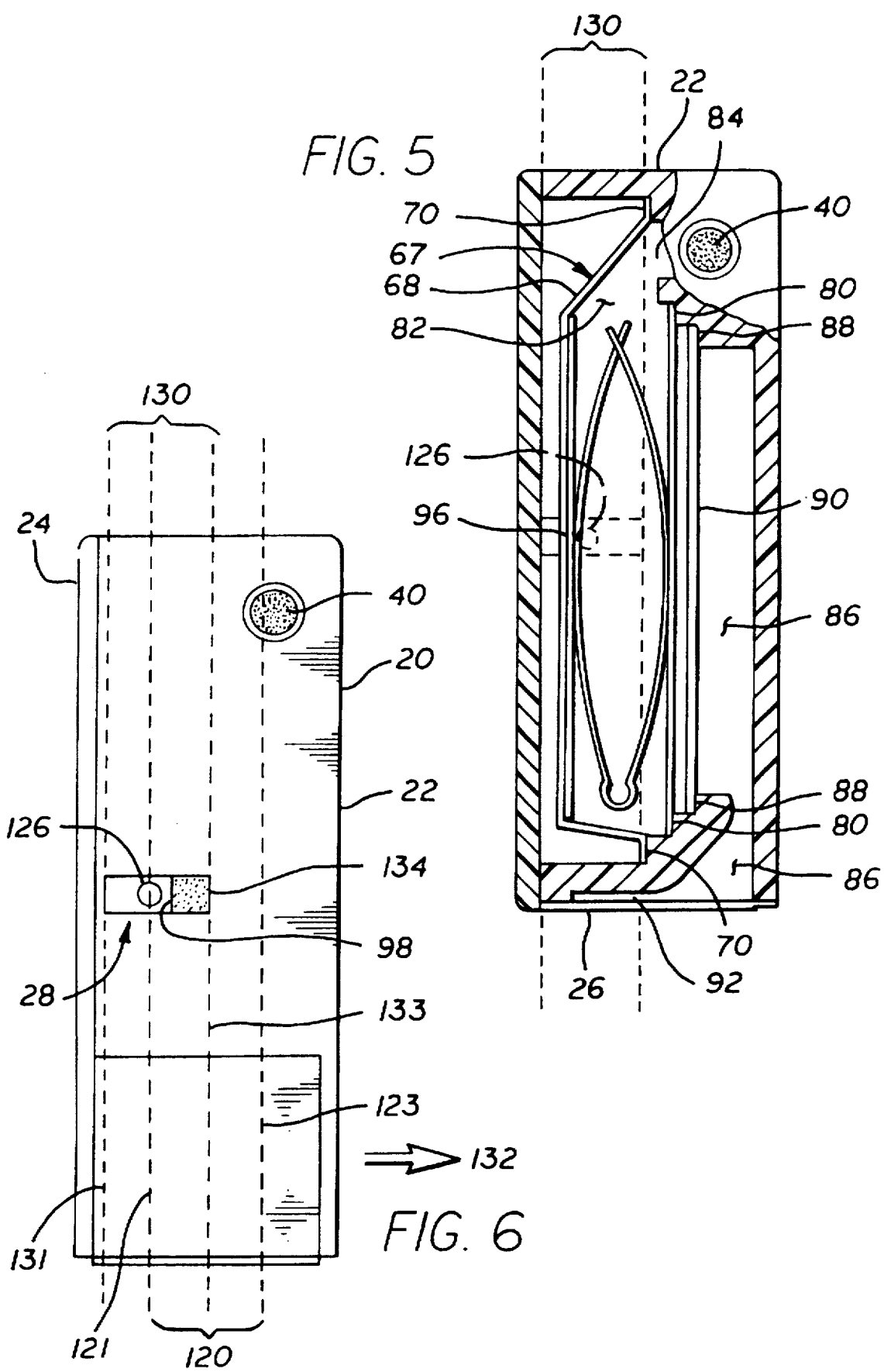

INK VOLUME SENSING AND REPLENISHING SYSTEM

CROSS REFERENCE TO RELATED APPLICATIONS, IF ANY

This application is a continuation-in-part of U.S. Ser. No. 08/240,297 filed May. 9, 1994 which is a continuation of U.S. Ser. No. 07/929,615 filed Aug. 12, 1992, abandoned and also is a continuation-in-part of U.S. Ser. No. 08/302,077 filed Sep. 7, 1994, U.S. Pat. No. 5,541,632, which is a continuation of U.S. Ser. No. 07/928,811 filed Aug. 12, 1992, abandoned, the disclosures of Ser. No. 08/240,297 and 08/302,077 each being incorporated herein by reference. This application is related to applicant's U.S. patent application Ser. No. 08/546,387 filed concurrently herewith entitled VOLUME INDICATING INK RESERVOIR CARTRIDGE SYSTEM filed concurrently herewith, and the disclosure of that application is also incorporated herein by reference.

BACKGROUND OF THE INVENTION AND PRIOR ART

1. Field of the Invention

The present invention relates generally to print head ink supply for high speed computer-driven printers such as ink jet printers and plotters. The invention relates more particularly to an ink supply system featuring replenishment of ink in a printer carriage-borne ink reservoir which supplies an ink-drawing carriage-borne print head, such replenishment being conveyed to the carriage-borne ink reservoir from a stationary ink supply off the printer carriage.

2. Description of the Related Art

In computer-driven ink jet printers and plotters, a supply of ink is usually held in a reservoir on the print head carriage immediately adjacent the print head to provide a ready ink supply to the print head. This reservoir is usually combined with the print head in a single cartridge. In such printers, for example, this "on-board" ink reservoir is ordinarily maintained at a sub-atmospheric, or negative, pressure, so that ink will not leak or "drool" from the print head. Various types of ink reservoirs are conventionally used, including refillable ink reservoir cartridges, which are mounted on the moveable printer carriage, throwaway replaceable cartridges, and combinations of on-board and remote or "off-board" ink reservoirs. When an off-board ink supply is used ink is drawn to feed a print head unit or cartridge, which usually incorporates the on-board ink reservoir mentioned. The ink may be transferred from the off-board ink supply reservoir to the carriage born print head unit via flexible tubing for example.

In particular, certain known ink cartridges employ "spring bag" inner ink reservoir comprising a bag formed of flexible membranous sheet material with two side plates biased apart by a spring contained within. The spring, tending to increase the volume (and resisting shrinkage) of the bag, maintains a subatmospheric pressure within. Further Information regarding such cartridges can be found in U.S. Pat. Nos. 5,280,300 issued Jan. 18, 1994 to Fong, et al.; 5,325,119 issued Jun. 28, 1994 to Fong; and 5,359,353 issued Oct. 25, 1994 to Hunt et al., all of which are assigned to the assignee of the present application and are incorporated herein by reference.

It has been recognized that eliminating disposable ink cartridges, and, insofar as possible, waste of ink, in view of environmental concerns regarding the disposal of waste ink and ink containers, and further, providing lower purchase and operating costs to printer and plotter users, are desireable objectives. Provision of an off-board ink supply which can be easily refilled is a significant step in this direction as operators of the printer equipment can refill the ink supply at longer time intervals, and are not frequently disposing of waste ink cartridges or ink.

Difficulties in providing such an off-board ink supply and on-board ink reservoir have been encountered. Particularly, the ready supply amount of ink in an on-board ink springbag reservoir, for example, must be maintained within certain limits, at the same time maintaining the negative pressure within the bag. This process is difficult, as infusion of ink into the reservoir must be regulated to prevent pressure within the bag from rising to atmospheric, and requires careful monitoring of ink volume in the bag of the on-board reservoir. One solution to monitoring ink volume is to "count drops" i.e. to monitor the amount of ink ejected from the print head by counting individual ejections of ink. This drop counting and other known methods tried have not yielded accurate results.

Furthermore, introduction of air into the print head must be prevented in connection with replenishment of the ink supply to ensure proper printer operation. Moreover, movement of the print head carriage and consequently the flexible conduit between the off-board ink supply and the on-board reservoir causes fluctuations in pressure and delivery rate of ink being transferred, and also facilitate air bubbles traversing the conduit to contaminate the on-board reservoir. These conditions can compromise proper functioning of the print head if the air enters the on-board reservoir and is drawn into the print head or if internal pressure is raised to, or above, atmospheric by such pressure or flow fluctuations allowing ink to drool from the print head.

These difficulties having been recognized, the present invention is directed to providing, at a reasonably low cost, a system for replenishing an on-board ink reservoir, thereby reducing waste. More particularly, a system is provided which is adapted for use with an on-board ink reservoir maintained at a sub-atmospheric pressure, and includes monitoring the volume of ink in an on-board reservoir and replenishing it as required in a controlled manner.

SUMMARY OF THE INVENTION

The present invention accordingly provides a method for replenishing a carriage-borne ink reservoir in a computer-driven printer having a movable print head carriage, a carriage position monitor, a print head, and a carriage-borne ink reservoir carried by the carriage, comprising:

a. providing an optical ink level monitor configured to sense a position of an ink level indicator in said carriage-borne ink reservoir as the carriage moves past said optical ink level monitor;

b. providing an ink reservoir housing having a discontinuity comprising an ink level indicator viewing location incorporated in said ink reservoir housing;

c. providing an ink level indicator observable at the viewing location, wherein the observable ink level indicator position is related to a volume of ink contained in the ink reservoir;

d. sensing said ink level indicator;

e. providing an off-board ink supply for replenishment of ink in said carriage-borne ink reservoir; and f. replenishing said carriage-borne ink reservoir as required, such replenishment occurring based upon the sensed ink level in said carriage-borne ink reservoir.

In a more detailed aspect, an ink conduit having a flexible ink supply line portion is disposed between the off-board ink supply and the carriage-borne ink supply. Structure comprising a pressure and flow limiting and stabilization means is incorporated in the ink replenishment system, and is disposed adjacent the carriage-borne reservoir, to provide a controlled flow of ink to the carriage-borne reservoir in replenishment, allowing the carriage-borne reservoir to remain at subatmospheric pressure throughout a replenishment cycle. This flow limiting and stabilization means can comprise a constricted fluid conduit, and further may be defined by an inner lumen of a needle and septum connector between the carriage borne ink reservoir and the flexible supply line. Further, an air accumulator, including a riser and one-way air vent, is incorporated in said conduit to prevent air from reaching the print head. The one-way air vent allows air to exit the air accumulator but prevents the escape of ink and the entrance of air or other impurities.

In a further more detailed aspect, a light source and photoelectric sensor can be employed to sense the ink level. Openings in the ink reservoir housing allow a line of sight through the cartridge in which the ink level, comprising a moveable wall of an inner springbag ink reservoir, is observable. The openings are sized so that a range of positions of the ink level are observable, and when it is mounted on a printer carriage the ink level can be sensed by a change in light emitted by the light source and received by the photoelectric sensor. When the carriage moves past the photosensor the ink level is detected as located at a direct line from the light source to the sensor a carriage position by a change in light sensed, and the position of the cartridge is known by virtue of the carriage position monitor with reference to an optical encoder bar and an optical sensor associated therewith. The relative positions of these elements being thus sensed, ink volume is determined according to a known relation of ink level position with respect to the rest of the cartridge.

BRIEF DESCRIPTION OF THE DRAWINGS

FIG. 4 is a schematic representation of an ink supply system according to the invention in a computer-driven printer;

FIG. 5 is a vertical cross section, partially in elevation view, of the cartridge of FIG. 3 taken along line 5—5 therein;

FIG. 6 is an elevational view of the cartridge of FIG. 5;

DESCRIPTION OF THE PREFERRED EMBODIMENTS

Figure 1:
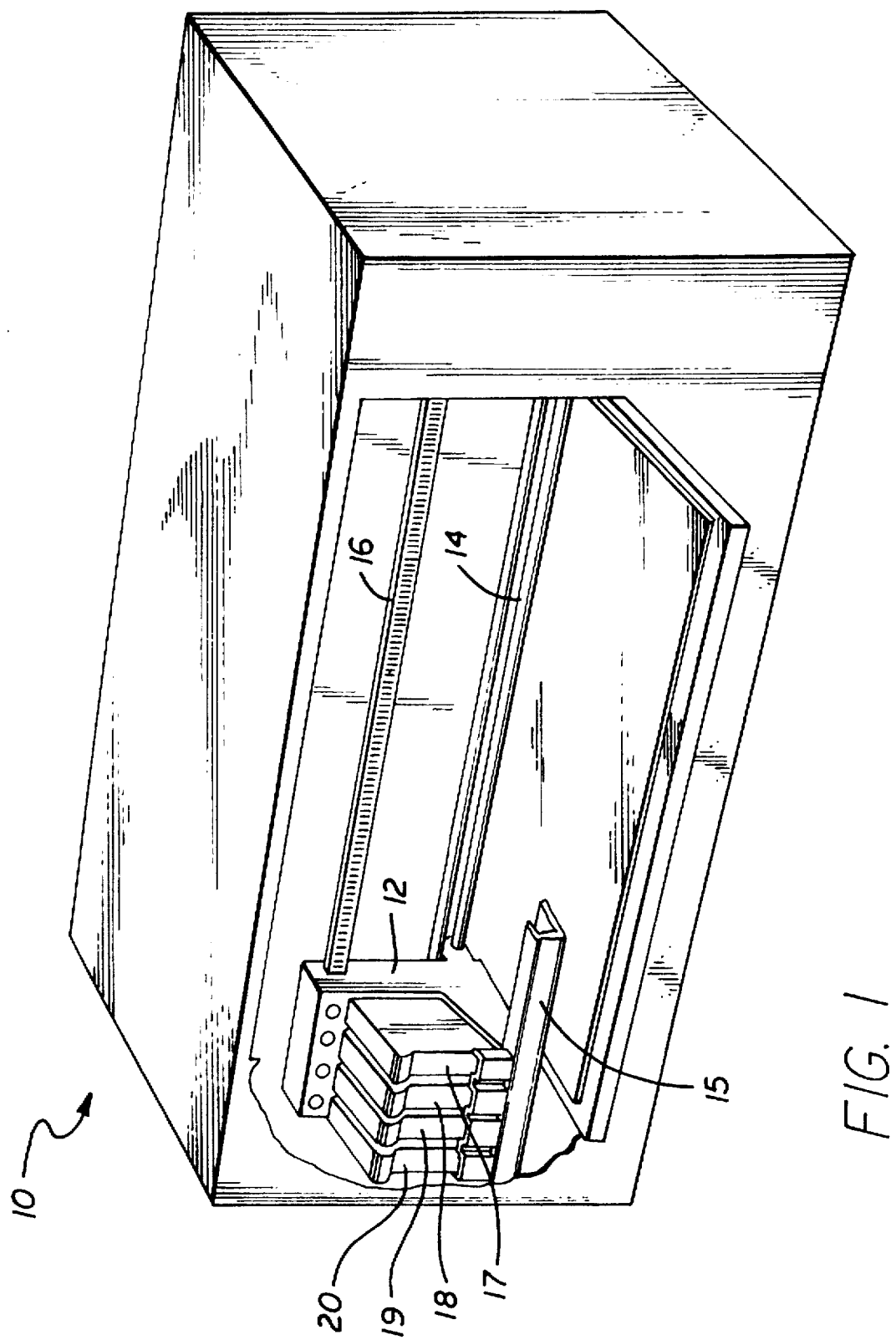
FIG. 1 is a perspective view of a computer-driven printer, illustrating the environment of the invention.

With reference to FIG. 1 of the drawings, which are given by way of example and not by way of limitation, a computer-driven printer 10, of the ink jet type wherein printing is performed by extremely small ejections of ink, as is known in the art, includes a carriage 12 slidably supported on supports 14 and 15, and an encoder bar 16 which in conjunction with an optical scanner (not shown) monitors the position of the carriage. On-board print head and ink reservoir cartridges 17, 18, 19, and 20, are mounted on the carriage and each contain, for example, color ink (e.g. cyan, magenta, or yellow), or black ink, enabling color printing and black ink only printing for example. For purposes of this discussion reference will be made to a single ink cartridge, but it will be apparent that the discussion is applicable to any and all ink cartridges shown.

Figure 2:
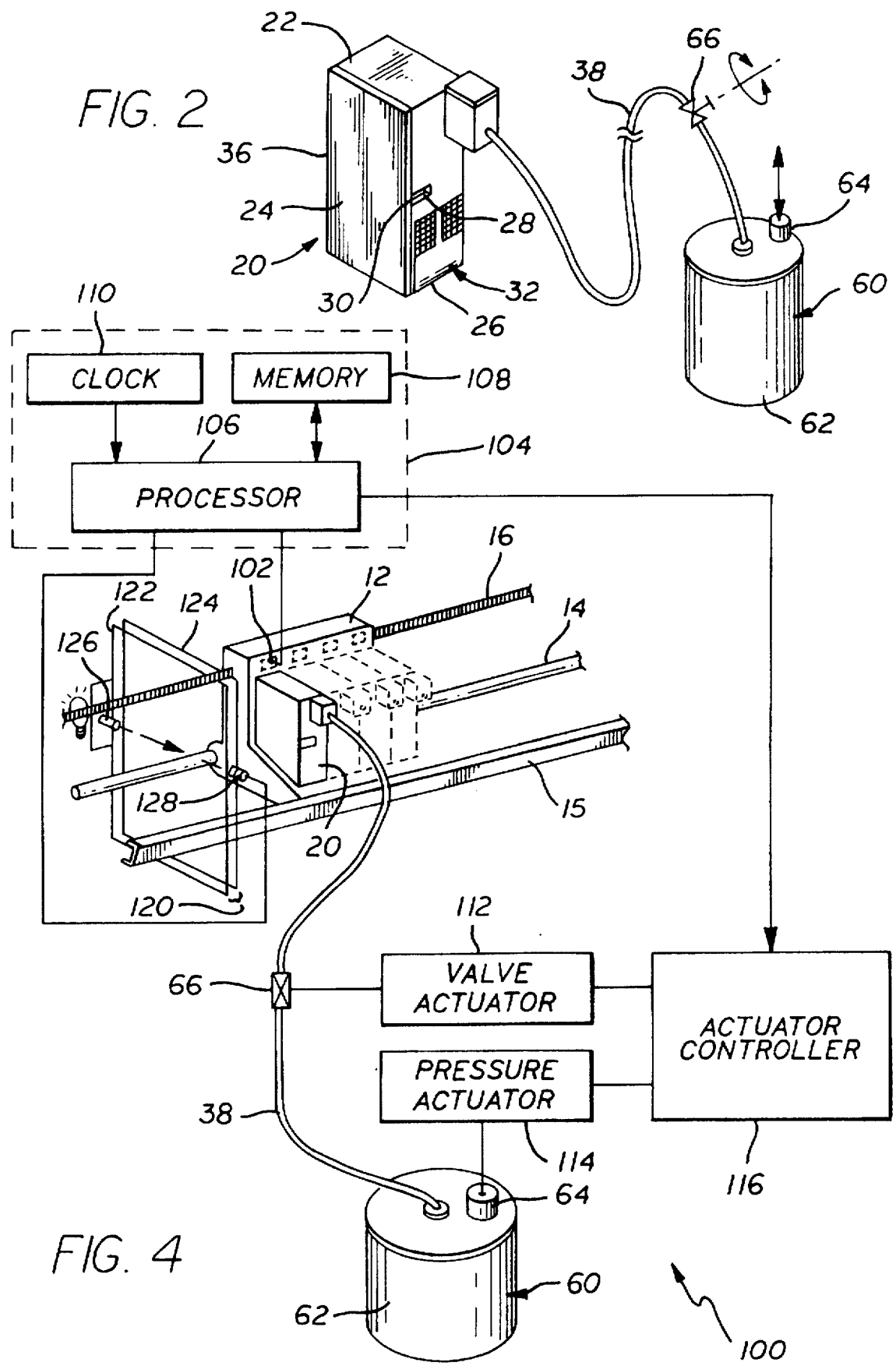
FIG. 2 is a perspective view of a print head cartridge according to the invention and a connected off-board ink supply.

An ink cartridge 20 of the invention is seen in FIG. 2 to comprise a molded rigid plastic resin outer housing 22, having a cover plate 24 intended to be affixed as by cementing or welding to the remainder of the housing. The cartridge has an ink discharge aperture in its lowermost end wall (not shown) to which is affixed an electrically-driven print head 26. A viewing location 28 is defined by a discontinuity in the housing 22 defined by a first slot 30 in a first side 32, and, as can be seen in FIG. 3, a second slot 34 aligned with the first slot, which allows a line of sight through the housing from the first side to a second, opposite, side 36.

Figure 3:
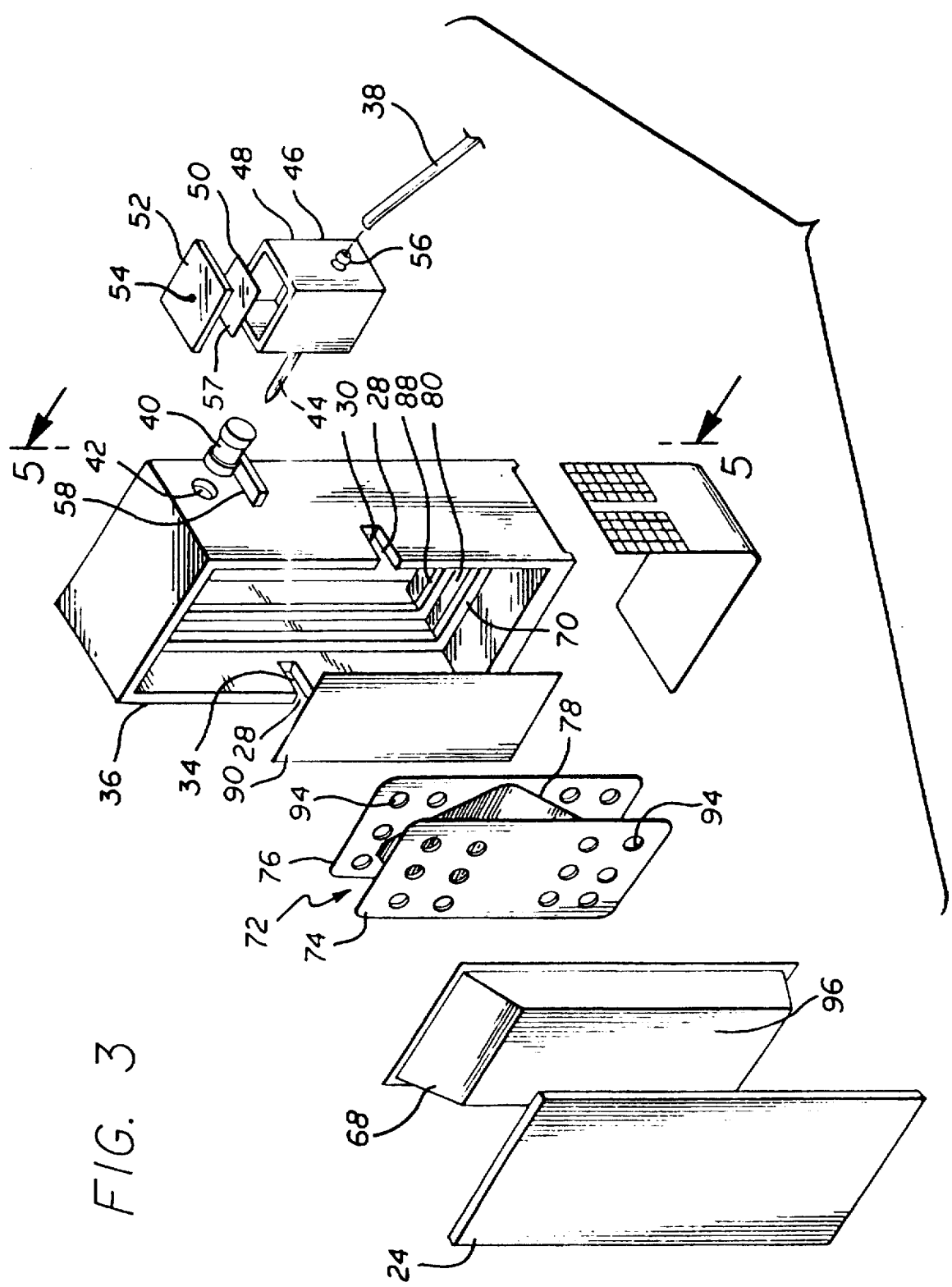
FIG. 3 is an exploded perspective view of a print head ink cartridge for a thermal ink jet printer containing a collapsible ink reservoir structure.

With reference to both FIGS. 2 and 3, an ink supply line 38 can be connected to the cartridge 20 via a connector, which in this embodiment comprises a septum 40 formed of an elastomeric material inert with respect to ink and disposed in an opening 42 in the housing 22, and a needle 44 adapted to pierce the septum. This connector gives a connection capability free of contamination by air or other impurities. A capillary tube (45 in FIG.7) comprising the interior lumen through the needle also acts as a pressure and flow fluctuation limiter with respect to ink replenishment of the on-board ink reservoir in the cartridge 20 from the flexible supply line 38, and stabilizes the flow at an amount below that which would raise the pressure within the ink reservoir of the cartridge 20 above a preselected subatmospheric pressure. The septum may be pre-slit to allow connection of a needle with a relatively blunt point, and the septum can be compressively loaded to effect a seal of any opening formed therethrough by insertion of the needle 44 when it is withdrawn.

An air accumulator 46 is incorporated in the ink supply line 38 adjacent the connector needle 44, and comprises a riser 48 and an air valve 50 formed of a porous membrane which allows air to pass therethrough, but will not allow ink to pass through. A cover plate 52, incorporating a small opening 54 to allow escape of air, closes the top of the riser 48. A layer 57 of non-volatile liquid, such as glycol, is disposed over the membrane, preventing air infiltration through the membrane and into the riser even though a vacuum is applied to the interior of the riser 48 of the accumulator 46 lowering the pressure therein to subatmospheric. Alternatively or in addition to the provision of the layer 57 of liquid, a check valve (not shown), such as a flapper or duck-bill valve biased to a closed position, can be provided. The check valve controls the opening 54 on the cover plate to allow escape of air from the riser and prevent air from being drawn into the riser if the pressure in the riser drops below atmospheric. Since it is essential that the riser remain relatively upright for the air accumulator to function properly to trap air bubbles, a ledge 58 is incorporated in the housing 22 to prevent rotation of the air accumulator 46 around a central axis of the needle connector.

In further embodiments, not shown, a conventional one-way valve, such as a duckbill or a flapper check valve, or a float valve and check valve combinations is substituted for the membrane air valve.

A ribbed connection portion 56 allows connection of the flexible ink supply line 38 to the riser 48. The needle 44 is preferably integral with the riser and formed of a similar ink-inert plastic. The ink supply line 38 is formed of an elastomer which does not react with print ink, and allows substantial flexing of the line as required to connect the cartridge moving on the print carriage 12 to the stationary off-board ink supply 60 but resists excessive deformation due to positive and negative pressures within the supply line.

With particular reference to FIG. 2, an off-board ink supply 60 incorporates a sealable container 62 having an actuatable pump 64 configured to pressurize the interior of the container (or evacuate it if required). Adjacent the container a valve 66 controlling ink flow from the container 62 through the ink supply line 38 is provided, which, in conjunction with the pump 64 is employed in controlled replenishment of the on-board ink reservoir in the cartridge 20. This valve is a check valve having a cracking pressure less than the pressure to which the ink is pressurized by the pump 64, but greater than that which is required to hold it closed against the negative pressure within the on-board ink reservoir, and thus holds against sufficient vacuum as may be required within the system during normal operation of the printer 10, but opens to allow replenishment when the system is pressurized by the pump 64. Alternatively, the valve 66 can be an actuatable valve, for example a stopcock, which can be opened or closed as required. In another alternative embodiment, the ink supply 60 is simply located vertically lower than the cartridge 20 by a vertical distance sufficient to maintain the negative pressure within the ink reservoir as required for normal printer function. This amount of vacuum usually implicates a vertical differential distance of at least three to seven inches.

An inlet tube (not shown) connected to the supply line 38 is provided within the ink supply container 62 to draw ink from the bottom of the container and avoid introducing air into the ink supply line 38. Any air that is drawn into the ink supply line, however, is trapped by the air accumulator 46, and is expelled from the system through the air valve 50 when the ink supply container 62 and line are pressurized by actuation of the pump 64. Alternatively, an ink-filled flexible bag (not shown) is sealingly coupled to the supply line, for example by a needle and septum connector as described above, and disposed within the container 62, which arrangement allows pressurization of the ink supply without contact between stored ink and air within the container. In a further embodiment (not shown) such an ink bag is squeezed by opposing surfaces. And in a further alternate embodiment a syringe pump (not shown) comprising a variable volume chamber connected to the conduit in conjunction with one-way valves disposed in the conduit on each side of the point of connection is used to pressurize the ink in the ink supply conduit.

As will be apparent, ink flow in the replenishment system into the on-board ink reservoir cartridge 20 is stabilized, as well as metered, by the capillary segment comprising inner lumen of the needle 44 of the connector. The constricted capillary tube allows only a preselected flow through the connector into the ink cartridge, with a small known and allowable variation, over an range of pressure fluctuations in the ink supply line 38 occasioned by pressurization for replenishment, overlain with pressure fluctuations caused by movement of the print head carriage 12 and consequently the supply line 38. The amplitude of pressure and flow fluctuations in the supply line is attenuated and a relatively stable preselected flow rate and fluid pressure results at a distal end of the needle 44. This preselected flow rate is chosen so that the on-board reservoir of the cartridge 20 will be filled relatively slowly so that the pressure in the ink reservoir is maintained at subatmospheric, or "negative" pressure during replenishment, even though the ink in the supply container 62 and supply line 38 is under a superatmospheric, or "positive" pressure. Slow filling also allows monitoring during filling to prevent over- or under-filling. The way in which a negative pressure in the on-board ink reservoir of the illustrated embodiment is created and maintained is discussed below, and it will be appreciated that this negative pressure can be maintained as long as the pressure and flow rate of replenishment ink entering the on-board ink reservoir does not overwhelm its inherent pressure regulating function.

With reference now to FIGS. 3 and 5, an inner ink reservoir structure 67 is formed within the housing 22, comprised in part of the housing, formed of a relatively rigid inert plastic resin, acting as a frame and also part of an inner inclosure of the reservoir 67, and a flexible ink bag membranous sheet 68, having a low elasticity and also inert with respect to ink, attached thereto by heat bonding the peripheral edges of the membranous sheet to the inner periphery of the housing. An outermost ledge 70 of a series of concentric ledges is provided around the interior of the housing for this purpose. The inner ink reservoir structure contains a stainless steel pressure regulator 72 which in turn is comprised of a pair of spaced substantially parallel plates 74, 76 urged apart by a welded spring 78 into engagement with the flexible membranous sheet 68 and a further concentric ledge 80. A chamber 82 of variable volume is thus formed within the housing, which chamber is in fluid communication with the connector septum 40 via a channel 84 formed in the housing, and the print head via a further channel 86. An entrance to said further channel 86 to the print head is defined by an innermost concentric ledge 88 and a filter 90 supported thereby and attached thereto at the peripheral edges of the filter. The lowermost portion of the outer housing 22 (as viewed in FIG. 5) is provided with an ink discharge aperture 92 through which ink is downwardly discharged from the channel 86 leading from the filter 90 to the print head 26.

The pressure regulator side plates 74, 76, best seen in FIG. 3, are of generally rectangular configuration with rounded corners to avoid damaging the flexible bag membranous sheet 68. One or more openings 94 is provided in each plate to allow ink to flow therethrough to the filter 90 in the assembled ink reservoir. The pressure regulator is reversible, facilitating assembly of the cartridge 20. After installing the septum 40 and print head 26, the filter 90, pressure regulator 72, membranous sheet 68, and cover plate 24 are attached in that order. As will be apparent, the concentric ledges 70, 71, and 76 and stacked component arrangement make the inner ink reservoir very easy to assemble. Prior to or simultaneous with attachment of the membranous sheet 68 to the housing 22, the regulator 72 is placed in position and pre-loaded by collapsing it partially against the spring force such that it is in a prestressed condition inside the inner ink reservoir bag chamber formed by the housing 22 and membranous sheet 68. The amount of this pre-stressing is readily controllable by the designer selecting the desired characteristics and amount of compression of the spring 78.

The flexible membranous sheet 68 and a side plate 74 of the regulator 72 forms a movable wall 96 of the inner ink reservoir, and this moveable wall gradually moves towards the housing 22 as the reservoir is evacuated of ink by the print head 26 in operation. The moveable wall is visible along a line of sight through the slots 30, 34 defining the viewing location 28. The membranous sheet 68 is sized with enough extra membranous sheet material near the edges of attachment to the outermost concentric ledge 70 of the housing 22 that the wall is freely moveable with the side plate between full and empty positions as best indicated in FIG. 5. With reference to FIGS. 5 and 6, it will be appreciated that when the inner ink reservoir 67 is filled with ink, the movable wall 96 and the inner ink reservoir will appear as an ink level 98 comprising an opaque obstruction in a line of sight through the housing at the viewing location 28.

The pressure regulator 72 constantly biases the movable wall 96 to the furthest position away from the housing 22 allowed by the volume of ink presently in the inner ink reservoir at any instant of time. Thus the ink level 98 will obstruct as much of the viewing location as the volume of ink will allow, and the position of this ink level is reliably indicative of the true volume of ink in the inner reservoir according to a readily determined functional relationship between the position of the ink level and the volume of ink remaining in the inner reservoir bag. This functional relationship is non-linear, but can be readily ascertained by empirical methods, or calculated, for example by use of computer-aided modeling techniques. Once this functional relationship is known, it can be used to correlate ink level to ink volume in the inner ink reservoir of the cartridge 20.

With reference now to FIGS. 4, 5 and 6, further components and operation of an on-board ink reservoir replenishment system 100 according to the invention will now be described. As is known in the art, the position of the carriage is determined by a position monitoring system including an optical encoder 102 incorporating the encoder bar 16 as the positional reference. By means of this position monitor the position of the carriage 12 at any instant of time is known to an ink replenishment controller 104 embodied in the printer (not shown). The controller further comprises a processor 106, memory 108, and clock 110. As will be apparent, components of the controller can be embodied on a single IC chip, and the specifics of implementation of these system elements can be one of the well known ways employed by persons skilled in the art. Use of the existing carriage position monitor of the printer results in lower costs.

The ink replenishment controller 104 controls replenishment of ink in the on-board ink reservoir cartridge 20, effecting ink replenishment when ink volume in the cartridge is drawn below a pre-selected amount by the print head 26 in printer operation. Replenishment is affected by providing the over-pressure required to move ink from the off-board ink supply 60 through ink supply line 38 and the needle connector capillary tube incorporated in the connector needle 44 and into the on-board inner ink reservoir chamber. If an actuatable valve 66 is used instead of a check valve as before described, a valve actuator 112 is provided to actuate the valve 66 in the ink supply line 38 as required to open and close a fluid communication through the ink supply line. A pressure actuator 114 is provided to actuate pump 64, which provides pressure to the off-board ink supply. An appropriate interface between the ink replenishment controller 104 and the valve and pressurization actuators is denominated an actuator controller 116 in the illustrated embodiment.

The volume of ink in the on-board ink reservoir of ink cartridge 20 is monitored by sensing the relative position of the ink level indicator 98, comprising the movable wall 96 of the opaque ink-filled inner ink reservoir ink bag, as viewed in a line of sight through the viewing location 28 in the cartridge. With reference particularly to FIG. 4, a hypothetical ink sensing region 120, defined by the region between two imaginary plains 122 and 124 is illustrated. A light source 126 and photosensor 128 are positioned in line so as to project light along a line of sight through the viewing location 28 of the cartridge 20 when the cartridge is moved through the beam of projected light from the light source to the photo sensor. The ink sensing region 120 represents in reality simply the range of positions of the carriage 12 where a direct line from the light source to the photosensor passes through the openings 30, 34 of the viewing location and light from the light source potentially could be detected by the photo sensor through the viewing location if the viewing location is unobstructed by the ink level 98. It can be thought of as any segment of the path of carriage motion through which a single discrete point on the carriage passes during the time when the openings are so aligned with the light source and photosensor, and thus would extend a distance commensurate with or less than the width of the openings, and specifically it can be referenced as that section of the encoder bar 16 traversed by the optical encoder 102 during that time.

Thus, this ink level sensing region wherein the position of the ink level 98 defined by the movable wall 96 with respect to the housing 22 of the cartridge 20 can be sensed will always be known, as the positional relationship between the ink cartridge 20, carriage 12 and viewing location 28 are always known due to the fixed position of the cartridge in the print head carriage. This allows sensing of the ink level only when the carriage, and therefore the viewing location, is in the ink sensing region. As will be apparent, the system will not sense the ink level unless the carriage is in the ink sensing region, avoiding the requirement to distinguish the cover plate 24 or edges of the openings 30 and 34 comprising the viewing location from the ink level 98. As will also be apparent, openings (not shown) in the carriage must be provided adjacent the viewing location for light to pass through if the carriage would otherwise obstruct the line of sight from the light source 126 to the photosensor 128.

As an alternative to the above, the carriage 12 could act to screen light from the light source 126, for example by making the width of openings therein with respect to the direction of motion of the carriage the same or less than the width of the openings 30, 34 of the viewing location 28. Thus light could only reach the photosensor 128 when the carriage was in the ink sensing region associated with a particular pen. In this latter case however, the ink level must be distinguished by the system from an edge of the openings comprising the viewing location 28, and this requires the direction of motion of the carriage to be taken into account.

Returning to the illustrated embodiment, when the carriage 12 moves into the ink level sensing region the position of the ink level will be sought by the ink replenishment controller 104. The position is sensed when the opaque ink level 96 of the movable wall of the inner ink reservoir 67 interrupts the beam of light projected along the line of sight from light source 126 to the photo sensor 128. More properly, the position of the print head carriage 12 is sensed by the optical encoder 102 at the time instant when the photo sensor detects a change in the light projected due to obstruction by the ink level 98. The position of the ink level being known at that instant to correspond to the position of a direct line between the light source 126 and the photo sensor 128, and the position of the carriage being known at that instant from the carriage position monitor optical encoder and encoder bar 16, the relative positions of the ink level 98 and the on-board ink reservoir cartridge 20 are then known for that time instant. Given this information, the processor 106 can correlate this information with the volume of ink in the on-board reservoir at that instant from the known functional relationship between the position of the movable wall 96 comprising the ink level 98 and the ink level cartridge housing 22 which is stored in memory 108. This functional relationship can be stored in the form of a look-up table or a numerical series approximating the function, or a series of calculation steps, for example, as is known in the art.

In a further embodiment, from data generated by the optical encoder 102 and photosensor 128, the system simply monitors the direction and speed of movement of the carriage 12, and the pattern of light detected, including the duration of each period of light and dark detected, as the carriage travels through the line of sight between the light source 126 and photosensor 128. The elements of the pattern corresponding to the carriage and cartridges 17, 18, 19, 20, for example, mounted thereon will be known, the only variables being the attributes corresponding to the ink level 98 position in each cartridge. Correlation of the pattern of light thus detected to the volume of ink in each cartridge is here again according to a functional relationship previously determined and programed in the memory 108 of the controller 104. This correlation is used to determine when a particular cartridge 20 needs replenishment, and can be used to monitor refilling.

While the illustrated embodiment employs a reservoir having one movable wall 96, it will be apparent that the invention can be applied to an ink reservoir having two movable walls (and hence two viewing locations associated therewith) on opposed sides. In this embodiment the distance between movable walls (not shown) is related to the volume of ink in the reservoir. After the relative positions of the two walls are sensed as in the single wall embodiment, but now with respect to each other and not the housing, the volume is then determined based on a stored function previously determined by empirical or mathematical methods relating the distance between walls and volume incorporated in a controller as with the illustrated embodiment.

In a further alternate embodiment (not shown) a reservoir having two movable walls and one viewing location wherein one of the movable walls may be viewed is provided. The two movable walls move approximately the same distance in opposite directions in filling or evacuating the ink reservoir. This embodiment would function in all other ways just as a reservoir with one movable wall 96 within a housing 22, but would be inherently less able to accurately monitor the volume of ink in the reservoir as the two walls may not move uniformly, and the two walls may both be shifted in a single direction with respect to the housing 22, giving too high or low an ink level as seen within the viewing location.

In operation the ink volume is monitored periodically, for example once for each time a complete page is printed by the printer 10. The minimum volume of ink required in the on-board ink reservoir corresponds, for example, to that needed to print a full black-out page. Given these parameters by way of example, if the minimum volume is approached replenishment is initiated and can be in either of two forms: 1) replenishment by filling until reaching a pre-selected volume corresponding to "full" with more frequent sensing during filling; or 2) replenishment of a pre-determined volume, the replenishment volume being simply a set amount corresponding to the difference between the pre-selected minimum volume limit and "full," or another amount based upon the actual volume sensed. With the second method a reserve capacity to mitigate over filling and/or a level check at a calculated time the volume theoretically approaches full can be employed.

Replenishment ink is metered into the on-board inner ink reservoir of the ink cartridge 20 as mentioned above, in the illustrated embodiment by providing a constricted capillary tube comprising the interior lumen of the needle 44 of the needle connector also including the septum 40 in the ink cartridge. As can be appreciated, applying a preselected constant pressure to the ink supply 60, opening valve 66 allowing flow of ink through the ink supply line 38 to the air accumulator 46 incorporating the riser 48 and needle 44 of the needle connector, will provide a superatmospheric pressure in the riser of the air accumulator. As can be further appreciated, a known volume of ink will pass through the capillary tube of the needle 44 of a known diameter and length in a known amount of time at a ink supply pressure of this selected value. This pressure is chosen to provide a slow filling rate allowing negative pressure to be maintained within the inner ink reservoir 82 by the pressure regulator 72. As can further be appreciated, the capillary tube is sized so that periodic pressure spikes occasioned by movement of the print carriage and supply line or opening of the valve 66 for example will be attenuated, and the flow through the capillary tube will be limited so that at no time will the function of the pressure regulator 72 maintaining a sub-atmospheric pressure within the on-board ink reservoir be compromised.

The slow filling rate also allows monitoring of the ink volume during filling mentioned above, which can be done every few seconds, or alternatively a period defined by counting a preselected number of lines printed if printing is ongoing during replenishment. Clock 110 is provided in the ink replenishment controller 104 to perform any required timing function in one embodiment. In a further embodiment the known flow rate through the capillary tube can be used by the controller to add a selected volume of ink to the on-board reservoir 82 by timing the period wherein the ink supply is pressurized.

After sufficient time to meter a selected amount of ink into the on-board ink reservoir is elapsed, and/or a full volume of ink in the reservoir 82 is sensed by the system, the pressure actuator 114 and pump 64 is stopped and the valve 66 closes or is closed, sealing off the on-board ink supply. This sealing off of the ink supply allows a sub-atmospheric pressure to be maintained in the on-board reservoir over the period of time between ink replenishments.

As before mentioned, the air accumulator 46 allows any air which may transit the ink supply tube 38 to accumulate in the riser 48 against the air valve membrane 50. During pressurization of the ink supply pressure within the air accumulator forces this trapped air though the membrane and out of the system through the opening 54 in the cover plate 52 of the air accumulator. The air valve is configured so that air will not pass therethrough in the opposite direction, for example by provision of a layer of liquid 57 on top of the membrane 50 excluding air therefrom. Such a layer of liquid can be formed of glycol or other substance which does not evaporate under normal printer operating conditions. Alternatively to or in conjunction with providing such a layer of liquid, a one-way check valve (such as a duckbill, biased-closed flapper valve, or the like) could be incorporated in the cover 52 sealing off the opening 54 therethrough for air escape except during the time that air is being forced out of the riser 48 and through such a valve during replenishment. Therefore the air valve 50 will hold a vacuum against the sub-atmospheric pressure within the on-board reservoir tending to draw ink through the capillary of the needle 44, the system otherwise being sealed by closure of the valve 66 in the ink supply line 38. Such membrane materials are commercially available from a number of manufacturers. For example GORETEX (a registered trademark of the manufacturer W. L. Gore & Associates for a teflon micropore material) can be used. As mentioned a check valve such as a duckbill or flapper valve (not shown) could be added to the system outside the membrane to further assure maintenance of a negative pressure in the system, or even be substituted for the membrane.

In another embodiment, after a desired amount of ink is metered into the on-board reservoir 67 the pump 64 is reversed and pressure in the supply line 38 is reduced to subatmospheric. The connector septum 40 being located at the uppermost portion of the on-board reservoir, any air introduced into the reservoir 67 will collect adjacent the connector. When the pressure is turned to a vacuum the collected air will be drawn out through the needle 44 and into the air accumulator 46, or alternatively through the supply line 38 to an off-board air accumulator (not shown) associated with the ink supply 60 for example.

With reference now to FIG. 6, it can be appreciated that for purposes of providing increased accuracy in sensing the ink level 98, the light source 126 should be made sufficiently small, and likewise the photo sensor (not shown) is sized to reliably detect a change in light sensed, i.e. to consistently "trip" at the same pre-selected location of the ink level 98, preferably the location of a hypothetical direct line between the light source and photosensor for sake of simplicity. As can be appreciated, this tripping of the photosensor will occur at some instant of time when some portion of the viewing location 28 is intersected by this hypothetical line from the light source to the photosensor. For purposes of illustration this would occur when a leading edge corresponding with line 133 is within a segment 120 between the lines 121 and 123 when the cartridge 20 is moving with the carriage (not shown) in a direction 132 from left to right as viewed in FIG. 6. As mentioned, the width of this space 120 is equal to the width 130 between lines 131 and 133, corresponding to the width of the viewing location 28.

In one embodiment, tripping of the photo sensor 128 may be "enabled" while the carriage 12 is within the ink level sensing region and not enabled at other times. This would eliminate noise signals caused by the photo sensor tripping pursuant to the passage of the cover plate 24 or an edge 134 of the first and second slots 30 and 34 in housing 122, for example, as previously discussed.

Figure 7:
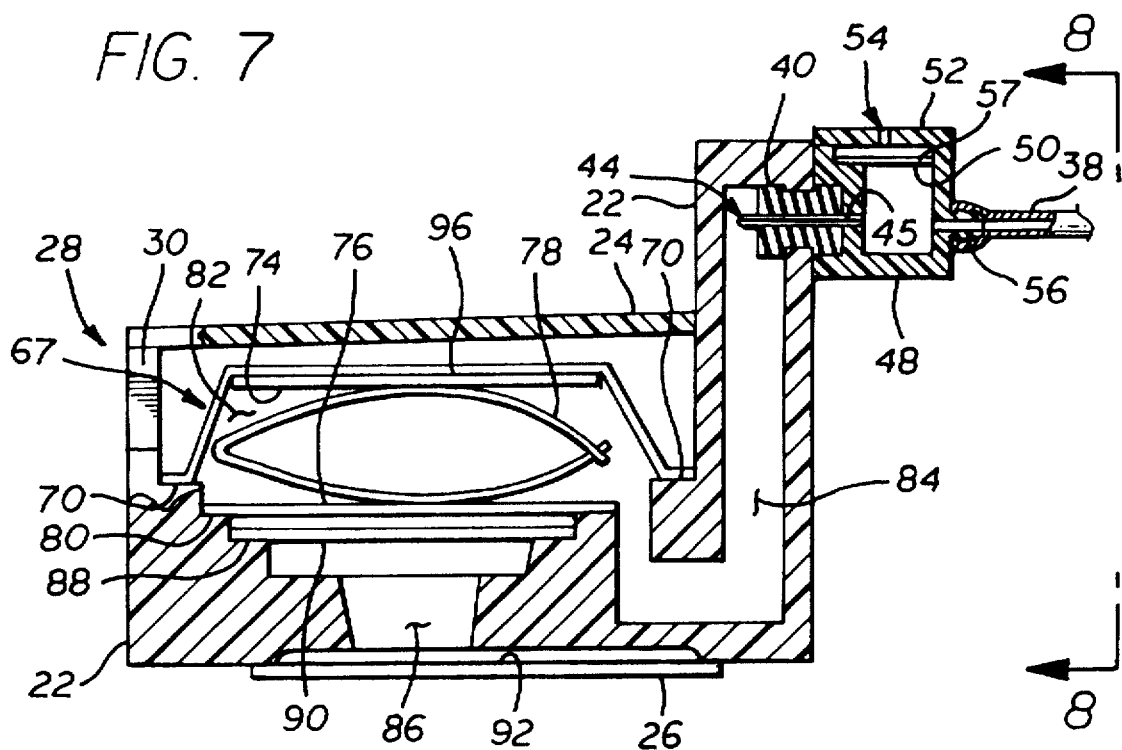
FIG. 7 is a cross-sectional view, taken along line 7—7 in FIG. 8 of an alternate embodiment of a on-board ink reservoir print head cartridge of the invention.
Figure 8:
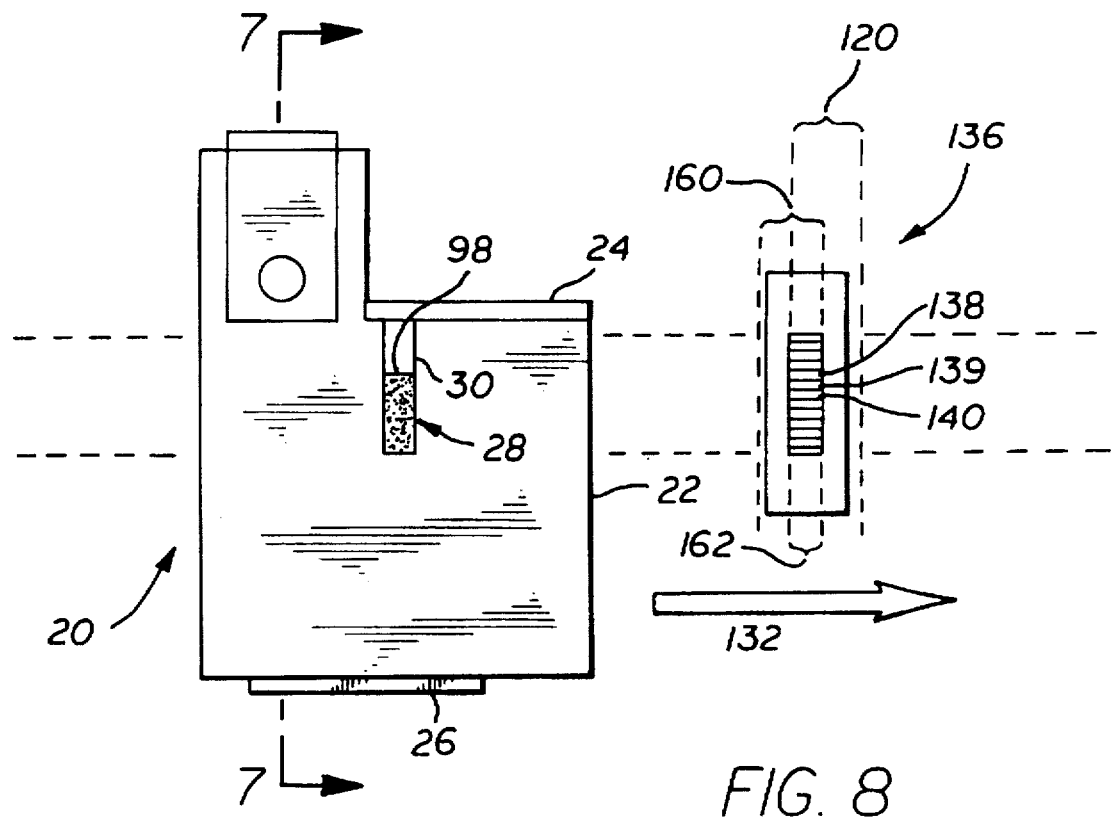
FIG. 8 is an elevational view taken on line 8—8 in FIG. 7 of the cartridge of FIG. 7.

Referring to FIGS. 7 and 8, an alternate embodiment is illustrated wherein the movable wall 96 is oriented horizontally. Here, like reference numbers refer to corresponding corresponding elements in the previously described embodiments, and in general, it will be appreciated that the above discussion applies in the description and operation of this further embodiment. However, the movable wall now moves vertically, and hence orthogonally to the directional motion of the carriage 12, and the on-board ink reservoir cartridge 20. In this embodiment, the position of the ink level 98 can be detected with a linear ray of 136 of discreet photo sensors (138, 139, and 140 for example), oriented vertically. As the viewing location 28 moves into the ink level sensing region 120, only the uppermost photo sensors will be tripped, the lowest photo sensor in the array tripped corresponding to the location of the ink level 98. Again, an illustration of the ink level sensing region 120 corresponds with a segment wherein a leading edge of the viewing location 28 moves in a direction 132 from left to right in FIG. 8. Another illustrated ink sensing region 160 would correspond with movement in an opposite direction of the on-board ink reservoir cartridge 20. But as will be appreciated, if the array has a width dimension 162, as opposed to a vertically oriented series of points (as approximated by sufficiently small sensors) the width of the array must be taken into account as well as the width of the openings of the viewing location 28.

Alternatively, a single photo sensor (not shown), can be positioned so as to trip when the ink level 98 falls below a pre-selected position corresponding to a selected minimum ink volume. This would initiate replenishment in an amount of ink equal to the difference in volume between this selected minimum volume and a "full" volume. A second single photo sensor (not shown) can be provided to detect a full condition.

Persons skilled in the art will readily appreciate that various modifications can be made from the preferred embodiment of the invention disclosed herein and that the scope of protection is intended to be defined only by the limitations of the appended claims.

We claim:

1. A method of sensing an ink level in a printer carriage-borne ink reservoir in a computer-driven printer having a movable print head carriage movable along a path of said print head carriage, a position of said print head carriage along said path being detectable by said printer, comprising the steps of:

providing said carriage-borne ink reservoir having a rigid outer housing and an inner reservoir including a movable wall contained in said rigid outer housing and movable with respect to said rigid outer housing, said inner reservoir defining a variable volume chamber within said rigid outer housing, said rigid outer housing further comprising an ink viewing location where an ink level indication is provided by an ink level indicator comprising said movable wall, said indicator and viewing location being configured so that the ink level indicator is illuminable by a beam of light directed onto said viewing location from outside the rigid outer housing, a position of said ink level indicator being movable with said movable wall and a position of the ink level indicator having a relationship to a volume of ink in the carriage-borne ink reservoir such that said volume of ink can be determined from a relative position of the ink level indicator and the rigid outer housing;

providing at a known position along said path of said carriage-borne ink reservoir an ink level sensing region through which said carriage-borne ink reservoir travels with said carriage;

moving said carriage-borne ink reservoir through said ink volume sensing region;

providing a beam of light directed across said path at a first location along the path within said ink level sensing region said beam of light being directed onto said ink reservoir ink viewing location, when said reservoir moves through said ink level sensing region;

providing a light sensor for detecting said beam of light;

detecting said beam of light, the light detected being altered by interception of said beam of light by the ink level indicator at the viewing location in said carriage-borne ink reservoir when said ink level indicator is positioned at the first known location of the beam of light within said ink sensing region, whereby a position of the ink level indicator is detected;

detecting a second location along said path at the time the ink level indicator is detected at said first location, said second location being a position of said rigid housing when said ink level indicator is positioned at said first position, and comparing said first location and said second location at the time said ink level indicator is detected, whereby a volume of ink is determinable from a relationship between said first location and said second location.

2. The method of claim 1, further comprising the step of moving the ink level indicator with respect to the rigid outer housing of the carriage-borne ink reservoir in a direction parallel with the of said carriage.

3. The method of claim 2, further comprising the steps of:
providing a single photosensor at said first location in said ink sensing region which acts as said light sensor;
providing an encoder for sensing a position of the carriage and said carriage-borne ink reservoir.

4. The method of claim 1, further comprising the step of determining the volume of ink in said carriage-borne ink reservoir based on a relative position of the rigid outer housing with respect to the ink level indicator.

5. The method of claim 4, further comprising the steps of:
providing an off-board ink supply positioned at a location other than on the moveable carriage;
replenishing said carriage-borne ink reservoir from the off-board ink supply based on the volume of ink obtained from said determining step.

6. The method of claim 5, further comprising the steps of:
providing a flexible ink supply conduit between said off-board ink supply and said carriage-borne in reservoir;
providing a pressure differential between said carriage-borne ink reservoir and said off-board ink supply causing ink to flow through said ink supply conduit from said off-board ink supply to said carriage-borne ink reservoir.

7. The method of claim 6, further comprising the step of providing means for limiting and stabilizing the flow of ink through said flexible ink supply conduit into said ink reservoir to minimize pressure and flow variations caused by movement of the carriage, ink reservoir, and supply conduit.

8. The method of claim 6, further comprising the step of providing a means for limiting flow comprising a lumen having a smaller cross-sectional area than a cross-sectional area of said conduit.

9. The method of claim 6, fiber comprising the steps of:
providing a riser fluidly connected to the flexible ink supply conduit configured to capture air in said conduit before said air can enter said ink reservoir;
providing in said riser an air vent configured to allow passage of air out of said conduit, but prevents escape of ink from said air vent.

10. The method of claim 9, further comprising the step of providing a membrane in said air vent configured to allow passage of air through the membrane and out of said conduit, but prevent escape of ink from said air vent.

11. The method of claim 5, further comprising the steps of:
providing an air accumulator having a one-way air valve and in fluid communication with said flexible ink supply conduit and positioned adjacent said carriage-borne ink reservoir;
preventing air from entering said ink reservoir by accumulating air in the accumulator;
removing air from the accumulator through said one-way air valve.

12. The method of claim 11, further comprising the step of providing a membrane which acts as said one-way air valve to allow flow of air through the membrane and prevent flow of ink therethrough.

13. An ink level sensing system for a computer-driven printer having a movable print head carriage, a print head carried by the print head carriage, a carriage position monitor means for monitoring a position of said movable print head carriage, a carriage-borne ink reservoir carried by the print head carriage along a path of movement of said carriage, the carriage-borne ink reservoir being fluidly connected to the print head, comprising:

an ink reservoir housing carried by said moveable print head carriage and enclosing said carriage-borne ink reservoir said ink reservoir housing having an ink level indicator viewing location incorporated in said ink reservoir housing, an ink level indicator within said ink reservoir housing and observable at the viewing location, wherein said ink level indicator is movable with respect to said ink reservoir housing and a position of the ink level indicator with respect to the housing corresponds to a volume of ink contained in said carriage-borne ink reservoir, an ink level sensing region, through which said carriage-borne ink reservoir travels with said print head carriage, having a light source projecting a beam of light directed across said path as said carriage-borne ink reservoir travels through said ink level sensing region, said light being directed onto said ink level viewing location at a first point along said path corresponding with a location of said beam of light within said ink level sensing region when said ink reservoir housing is located at a second point along said path which is sensed by said carriage position monitor means, a light detector adapted to detect said beam of light, said ink level indicator being configured so that projected light detected by said light detector is altered by interception of light from said light source by the ink level indicator in connection with movement of the ink level indicator and movement of the ink level viewing location of said ink reservoir housing along the path of movement of said carriage through the ink level sensing region, said ink level viewing location being configured to accommodate a path of light from said light source to said detector, such that a position of the ink level indicator with respect to said ink reservoir housing is sensed by the light detector as the level indicator moves through the beam of light, said ink level indicator position with respect to the housing being sensed when said ink level indicator is at said first point, a processor receiving information signals from said carriage position monitor means and said light detector, said processor produces a determined signal that represents a volume of ink in said carriage-borne reservoir, which corresponds to the position of the ink level indicator with respect to said ink reservoir housing.

14. The ink level sensing system of claim 13, wherein the ink level indicator moves with respect to the ink reservoir housing in a direction parallel with the movement of said print head carriage.

15. The ink level sensing system of claim 14, wherein said ink level indicator comprises an edge of an opaque region as viewed in said ink level viewing location, said viewing location otherwise allowing light to pass through said carriage-borne ink reservoir housing from a first side of said housing to a second side of said housing, said second side being opposite from said first side, said light detector being a single photocell positioned at said second side of said housing.

16. The ink level sensing system of claim 15, further comprising an off-board ink supply positioned at a location other than on said moveable print head carriage, and further comprising a conduit between said off-board ink supply and said carriage-borne ink reservoir, said conduit being adapted to convey ink from said off-board ink supply to said carriage-borne ink reservoir, said off-board ink supply being configured to replenish said carriage-borne ink reservoir from the off-board ink supply based on a predetermined ink volume in said carriage-borne ink reservoir.

17. The ink level sensing system of claim 16, further comprising a flow limiter comprising a lumen having a smaller cross-sectional area than a cross-sectional area of said conduit.

18. The ink level sensing system of claim 17, further comprising:
   a riser fluidly connected to said conduit configured to capture air flowing through said conduit before said air entering said carriage-borne ink reservoir; and
   an air vent in fluid communication with said riser and configured to allow passage of air out of said riser, and prevent escape of ink from said air vent.

19. A computer-driven printer having a movable print head carriage which moves along a path, a print head carried by the print head carriage, a carriage position monitor means for monitoring a position of said carriage, a carriage-borne ink reservoir carried by the print head carriage, said carriage-borne ink reservoir being fluidly connected to the print head, said printer comprising:
   a carriage-borne ink reservoir housing carried by said movable print head carriage and enclosing said carriage-borne ink reservoir, said ink reservoir housing having an ink level indicator viewing location incorporated in said carriage-borne ink reservoir housing;
   an ink level indicator within said ink reservoir housing and observable at said ink level indicator viewing location, wherein said ink level indicator is movable with respect to said in reservoir housing and an observable position of the ink level indicator corresponds to a directly related in a known way to an ink level in turn directly related to volume of ink contained in said carriage-borne ink reservoir;
   an ink level monitor configured to sense a position of said ink level indicator with respect to said carriage-borne ink reservoir housing, said ink level monitor comprising:
      an ink level sensing region, through which said carriage-borne ink reservoir housing travels with said print head carriage;
      a light source projecting a beam of light directed across said path as said carriage-borne ink reservoir housing travels through said ink level sensing region, said light being directed onto said ink level indicator viewing location at a first point along said path corresponding to a location of said beam of light within said ink level sensing region when said carriage-borne ink reservoir housing passes through said ink level sensing region;
      a light detector adapted to detect a first position corresponding to the position of said ink level indicator by alteration of light from said light source projected onto said ink level indicator viewing location when said ink level indicator is at said first point along said, path said projected light detected by said light detector being altered by interposition of said ink level indicator observable at said ink level viewing location of said carriage-borne ink reservoir housing when said ink level indicator is positioned at said first point said light detector sensing an information signal indicating said first position;
   a processor receiving information signals from said carriage position monitor means and said light detector, said processor using said information signals to determine an ink level in said carriage-borne ink reservoir, said processor determining a relative position of said ink level indicator with respect to said carriage-borne ink reservoir housing by comparing an information signal from said carriage position monitor means comprising a second position, said second position corresponding to a position of said ink reservoir housing at the time said first position is detected by said light detector, whereby an ink level is determined by comparing said first position and said second position, information relating position monitor signals and the determined ink level being related to the ink volume in said carriage-borne ink reservoir; and
   an off-board ink supply; and
   means for replenishing ink in said carriage-borne ink reservoir from said off-board ink supply, carriage-borne ink reservoir being replenished based on ink level information generated by sink level monitor.

20. A computer-driven printer having a movable print head carriage and a carriage position monitor means for monitoring a position of said carriage, said printer comprising:
   a carriage-borne ink reservoir cartridge carried by said movable print head carriage, along a path of movement of said carriage, said carriage-borne ink reservoir cartridge including:
      a rigid housing having a first side and a second side, a window including a viewing location whereby a line of sight is afforded from said first side through an interior portion of said housing to said second side, an inner periphery, a print head, and an ink channel in fluid communication with said print head, said print head being integrally disposed in said housing;
      a flexible impervious membranous sheet having peripheral edges, said peripheral edges being sealingly bonded to said inner periphery of said housing, said flexible impervious membranous sheet and a portion of said housing together enclosing an ink reservoir chamber of variable volume within said rigid housing;
      a pressure regulator disposed within said ink reservoir chamber between said housing and said impervious membranous sheet, said pressure regulator including a first plate and a second plate biased apart by a spring disposed between said first plate and said second plate, the first plate being configured to allow fluid flow past said first plate when the pressure regulator is positioned in-between said housing and said membranous sheet, the second plate cooperating with said flexible impervious membranous sheet to form a movable wall, said pressure regulator being held in a compressed state where said spring exerts pressure on said first plate and said second plate, said first plate being urged against and in force transmitting contact with said housing and said second plate being urged against and in force transmitting contact with said impervious membranous sheet, whereby said ink reservoir chamber is biased to a greatest possible interior volume by said pressure regulator, giving rise to a sub-atmospheric pressure within said ink reservoir chamber, said movable wall being observable at said viewing location from a position outside of said housing;

an ink level indicator comprising said movable wall, a position of said ink level indicator with respect to said housing being related to a volume of ink in said carriage-borne ink reservoir cartridge and said ink level indicator being observable through said window said movable wall moving with respect to said rigid housing in a direction parallel to a direction of movement of said carriage along said path;

said printer further comprising an ink level monitor including:

an ink volume sensing region, through which said carriage-borne ink reservoir cartridge travels with said print head carriage;

a light source projecting a beam of light directed across the path of said carriage-borne ink reservoir cartridge as said cartridge travels through said ink volume sensing region, said light being directed onto said viewing location when said viewing location is at a first point within said ink volume sensing region;

a light detector configured for detecting said beam of light, said detector being positioned in alignment with said light source and said first point so that light from said light source detected by said light detector is altered by the ink level indicator when said ink level indicator is positioned at said first point;

a processor receiving information signals from said carriage position monitor means and said light detector, said processor determining an ink level in said carriage-borne ink reservoir cartridge based on a relative position of the ink level indicator and carriage borne ink reservoir cartridge;

said printer further comprising an off-axis ink supply adapted for replenishment of ink in said carriage-borne ink reservoir cartridge, said carriage-borne ink reservoir cartridge being replenished based on said ink level in said carriage-borne ink reservoir cartridge; and an ink supply conduit fluidly connecting said off-axis ink supply and said carriage-borne ink reservoir cartridge, ink being transferred from said off-axis ink supply to said carriage-borne ink reservoir cartridge through said conduit in replenishing ink volume in said carriage-borne ink reservoir cartridge.

* * * * *

UNITED STATES PATENT AND TRADEMARK OFFICE
CERTIFICATE OF CORRECTION

PATENT NO : 5,757,390

DATED : May 26, 1998

INVENTOR(S) : Gragg et al.

It is certified that error appears in the above-identified patent and that said Letters Patent is hereby corrected as shown below:

Column 12, lines 46-47 after "path" delete [of said carriage-borne ink reservoir].

Signed and Sealed this

Tenth Day of November 1998

Attest:

BRUCE LEHMAN

Attesting Officer

Commissioner of Patents and Trademarks